Patented Aug. 15, 1933

1,922,187

UNITED STATES PATENT OFFICE 1,922,187

PROCESS FOR THE PURIFICATION OF AIR

Walter Zisch, Frankfort-on-the-Main, Germany, assignor, by mesne assignments, to E. I. du Pont de Nemours and Company, a Corporation of Delaware No Drawing. Application April 20, 1929, Serial No. 356,892, and in Germany April 21, 1928

3 Claims. (Cl. 23—4)

This invention has to do with exchange masses, that is, those which purify and renew exhaled air, such as that occurring in closed spaces or in breathing apparatus, by exchanging oxygen gas for impurities such as carbon dioxide and excessive quantities of moisture.

I have now found that masses consisting of, or containing alkali metal trioxides such as sodium trioxide, or mixtures of these trioxides, can be used with good results for purifying exhaled air. The alkali trioxides can be prepared in any known manner. However, exchange masses of exceptional activity containing alkali metal trioxide, for example, sodium trioxides can be prepared by reacting equi-molecular parts of natryl hydroxide and sodium peroxide by mixing them together, and if necessary heating them, to cause the following reaction:

$$NaO_2H + Na_2O_2 \rightarrow Na_2O_3 + NaOH$$

The reaction between the two substances very often assumes explosive character. It is therefore advisable to modify the speed of the reaction by admixing substances which do not take part in the reaction. Such substances may be inert materials such as sodium chloride, or substances favoring the absorption of the carbon dioxide from the exhaled air by the reaction product such as for instance alkali metal hydroxides, for example sodium hydroxide. Finally, an excess of alkali peroxide may be used in conjunction with the admixture of alkali hydroxide.

If one permits carbon dioxide or gas mixtures containing carbon dioxide, such as exhaled air from the lungs, to pass through or over sodium trioxide or mixtures containing sodium trioxides, there is a regular current of oxygen set free. This evolution of oxygen results from action of carbon dioxide on the product and is enhanced by the water vapor which is always present in exhaled air, and on account of the heat which is produced when this water is taken up by the hydgroscopic mass, the evolution of oxygen is favored.

I prefer to convert the exchange masses into a solid or porous form by adding alkali hydroxide to the finely pulverized mixture of alkali metal hydrogen perioxide and alkali metal peroxide, using pressure to briquette the mass, and applying heat to the molded pieces in order to convert the material to the desired product. The forming or molding of the mass can also be carried out during or after the heating process. When alkali metal hydrogen peroxide is mixed with alkali metal peroxide even in the presence of diluting agents such as alkali metal peroxide the temperature in the mixed mass gradually rises and may go up as far as 150 to 200° centigrade whilst the mass is converted into alkali trioxide. The conversion may be gauged by the amount of gaseous oxygen being liberated as soon as small fractions of the mass are brought in touch with water. If the amount of diluents is rather great and, in consequence, the rate of conversion becomes sluggish the reaction may be assisted by cautiously applying heat to the mass, taking care that the temperature does not exceed materially 150 to 200° C. Any rise above this limit is connected with avoidable loss of oxygen.

The molded masses can be used directly in breathing apparatus, or one can increase their surface and therefore increase the possibility that the gas will be brought into close contact with the exchange mass. This can be done by giving the molded pieces a wave-like serrated form or making them sufficiently thin that they will be completely utilized and that no unused material will remain in the interior parts of the mass. The molded pieces can also be made small enough that a breathing apparatus can be filled with the same. If it is desired, one can produce large molded pieces, and after heating these in order to cause the desired reaction and then cooling, the pieces may be broken up into granular form and used.

During the process of sifting out grains of the desired size "fines" are produced. These may be made up into briquettes or can be added to the mixture of the substances, preferably before molding or converting them by means of heat. In this manner, masses are produced having an exceptional porosity and increased efficiency for liberating oxygen.

It has been found advantageous to have present in the exchange masses, catalysts facilitating the liberation of oxygen in the presence of exhaled air. Such catalysts are, for example, oxides or other compounds of manganese, cobalt, copper and the like. These catalytic compounds can be incorporated into the mass at any time during the process of preparation. In many cases it is sufficient to dust the mass with the powdered oxides or their compounds. For example, copper sulphate may be used in place of copper oxide. The oxides can even be produced in the mass itself by mixing the latter with the correspondingly finely divided metal which is changed to oxide during the step of heating.

*Example 1.*—5.90 kilograms natryl hydroxide are added gradually to 10.0 kilograms sodium peroxide, mixing the two substances very thoroughly if necessary with grinding, taking care that the temperature does not rise too suddenly. After allowing the mixture to stand for some short time, gentle heat is applied so that the temperature in the mass does not exceed 150 to 200° C. After keeping it for some time the mass is allowed to cool, is then dusted with manganese peroxide powder and is ready for use.

*Example 2.*—5.9 kilograms natryl hydroxide are added in small portions to a mixture of 4.0 kilograms sodium hydroxide and 7.8 kilograms sodium peroxide having been ground together previously. The mixture is ground thoroughly and molded in a hydraulic press. The shaped pieces are heated gradually to about 120° C. and kept at this heat for some time. The molded pieces after cooling may be used as such in the breathing apparatus or they may be broken up into granular form. The fines are sifted off and used for admixing to the next charge as diluent.

The sodium trioxide obtained in this way has a yellowish color and gives off at once its contents of oxygen in gaseous form when brought into contact with water.

What I claim is:

1. In a method for renewing exhaled air, the step which comprises bringing said air into contact with a mixture of an alkali metal trioxide and an alkali metal hydroxide.

2. In a method for renewing exhaled air, the step which comprises bringing said air into contact with a mixture of sodium trioxide and sodium hydroxide.

3. In a method for renewing exhaled air, the step which comprises bringing said air into contact with a mixture of sodium trioxide and sodium hydroxide with a catalyst capable of promoting the liberation of oxygen from said trioxide in the presence of breathed air.

WALTER ZISCH.